3,321,537
FLUORINATION OF OLEFINS WITH ARSENIC
CHLOROFLUORO COMPLEX
Francis H. Walker, El Cerrito, and Attila E. Pavlath,
Berkeley, Calif., assignors to Stauffer Chemical Company, New York, N.Y., a corporation of Delaware
No Drawing. Filed Aug. 12, 1963, Ser. No. 302,122
6 Claims. (Cl. 260—653)

This invention relates to a new and novel process for preparing fluorinated compounds. In particular, it refers to a new process for preparing fluorinated organic compounds of the polyhaloalkane series, which constitutes reacting the inorganic fluorochloroarsenic complex

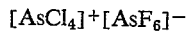

with halogenated olefins.

The fluorine containing products prepared are very valuable compounds. Most of them are known to some degree in the chemical literature. The physical and chemical properties displayed by these fluorine containing haloalkanes permits their use in a variety of applications. They find extensive use as intermediates for certain fluorine containing ethylenic monomers, as dielectric fluids, certain ones as propellants in aerosols, and as solvents in the dry cleaning industry.

Attempts at preparing fluorine containing polyhaloalkanes from halogenated olefins by direct fluorination or chlorofluorination heretofore have not been too successful. Direct fluorination in the vapor phase has been an awkward process not particularly suited to industrial application. Liquid phase direct fluorination has not been extensively employed.

Arsenic pentafluoride has been described as a fluorinating agent for haloolefins in U.S. Patent No. 2,549,988. Arsenic pentafluoride is a colorless gas boiling at minus 53° C. The fluorination of haloolefins with arsenic pentafluoride is accomplished only at higher temperatures and pressures. In addition to being a gas, which requires special equipment and handling, arsenic pentafluoride is an expensive reagent.

It is, therefore, an object of this invention to provide a process whereby halogen containing olefins may be fluorinated conveniently. Specifically, this method constitutes the first case in which fluorination of an olefin to yield a fluorine containing halogenated alkane can be accomplished at atmospheric pressure and ordinary temperatures using the normal laboratory glassware.

This object is accomplished by allowing the reaction of an olefin, where at least one carbon atom at the double bond contains at least one halogen atom, with the inorganic complex between arensic trifluoride and chlorine at atmospheric pressure. The reaction is carried out at the reflux temperature of the olefin used.

The active fluorinating agent in the reaction mixture is the fluorochloroarsenic complex $[AsCl_4]^+[AsF_6]^-$. The preparation of this species can be carried out either in situ or as a separate preparation. The physical properties of the fluorochloroarsenic complex is described in the literature by L. Kolditz (Zeit. Anorg. Allg. Chem., 280, 313–20 (1955)). The examples below will show the use of both methods. In general, the complex can be conveniently prepared in conventional glass equipment. Arsenic trifluoride is chlorinated with either a stoichiometric amount of chlorine if the total yield of complex is desired, or with an excess of arsenic trifluoride present if a usable solution is desired, since the complex is quite soluble in arsenic trifluoride. A small amount of water which acts as a catalyst should be added to the arsenic trifluoride before the chlorine introduction is started.

Although the reaction will take place over a wide range of conditions and reactant ratios, there exists certain limits which make the reaction more feasible. The respective proportions of the halogen containing olefin and the fluorochloroarsenic complex are not critical. It is desirable to use the two reactants in the molar ratio of 1:1, complex to olefin. This is our preferred ratio. When the complex is to be prepared in situ the preferred ratio of reactants is 2:1:1, arsenic trifluoride:chlorine: olefin.

The nature of the olefin to be fluorinated can be of any length, the only requirement for use in this invention is that there be at least one carbon atom at the double bond which contains at least one halogen atom.

As stated above, the present invention has the distinct advantage of being usable at atmospheric pressures and at temperatures conveniently attainable in the laboratory. This also allows for the use of ordinary laboratory glassware for the practice of the invention. For a batch process the reaction time is about five hours per mole of arsenic trifluoride; this is allowing for addition time of chlorine to the reaction mixture. During the reaction period the contents of the reaction vessel are preferably mixed by mechanical stirring.

The reaction can be carried out with or without a catalyst. Any Lewis acid type catalyst may be used, but our preferred catalyst is antimony pentachloride. The preferred range is .02 to .05 mole of antimony pentachloride per mole of arsenic trifluoride or fluorochloroarsenic complex. The use of a catalyst enables a more satisfactory conversion of olefin to fluorine containing alkane, although the formation of fluorochloroalkane can be obtained without the presence of said catalyst.

The work up of the reactions generally can be carried out simply by pouring the reaction mixture into water, the organic layer containing the fluorochloroalkane will form a second immiscible layer; washing further with portions of water will remove the inorganic salts. The organic layer after separation can be dried over a drying agent, such as magnesium sulfate, to remove any residual water. Initial analysis of the product composition was performed by gas-liquid partition chromatography. Further isomer identification was obtained from nuclear magnetic resonance investigation of the product. Normal separation of the fluorine containing products by distillation also can be carried out.

The following examples illustrate the process of this invention.

EXAMPLE I

A mixture of 2.0 moles of arsenic trifluoride, 5 ml. antimony pentachloride and a few drops of water was placed in a four-necked round bottom flask fitted with a stirrer, thermometer, reflux condenser and gas addition tube. Chlorine gas was passed into the mixture at the rate of 62.5 ml. per minute until no more solid appeared to separate. At the end of that time the unreacted arsenic trifluoride was removed in vacuo through a liquid nitrogen tray. In this way 0.6 mole of arsenic trifluoride was recovered. The remaining material in the flask was the fluorochloroarsenic complex

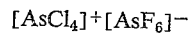

Trichloroethylene (0.7 mole) was added portionwise to the complex. The combination was heated to mild reflux and stirred. Refluxing was continued for one hour after addition of the trichloroethylene was completed.

The reaction mixture was poured into water, and the organic layer was separated and dried over magnesium sulfate. A total of 79.3 grams of organic product was obtained. The product had the following composition according to gas-liquid partition chromatography analysis: $CFCl_2CHCl_2$ 98.2%, $CCl_3CHCl_2$ 1.1%.

EXAMPLE II

Using the same equipment as described in Example I, trichloroethylene (0.5 mole) was added to a mixture of arsenic trifluoride (1.0 mole) and antimony pentachloride (0.02 mole). A few drops of water was added and chlorine gas was introduced into the reaction mixture at the rate of 62.5 ml. per minute. Heating was controlled so that there was a mild reflux during the chlorine addition and for one hour after the addition was completed.

The reaction mixture was poured into water and the organic layer separated. The organic layer was dried over magnesium sulfate to remove traces of water. There was obtained 51.9 grams of organic material. The following composition of the organic phase was obtained by gas chromatography analysis: 89.9% $CFCl_2CHCl_2$ and 10.1% $CHCl_2CCl_3$.

The isomer of the fluorochloro alkane was determined by $F^{19}$ and proton nuclear magnetic resonance spectroscopy. The isomer obtained was $CFCl_2CHCl_2$ and not $CCl_3CHFCl$. This was also true in Example I.

EXAMPLE III

Using the apparatus and process as described in Example II (tetrachloroethylene (0.5 mole) was added to a mixture of 1.0 mole arsenic trifluoride and 2.5 ml. antimony pentachloride. The fluorochloroarsenic complex was formed in situ by the addition of chlorine gas to the reaction flask. The reaction mixture was stirred and maintained at a mild reflux during the chlorine addition and for one hour after. The equivalent of 0.6 mole of chlorine gas was used.

The reaction mixture was worked up in the usual manner. There was obtained 57.9 grams of product which had the following composition by gas-liquid partition chromatography: 22.8% $CFCl_2CCl_3$, 75% $CCl_2=CCl_2$, 2.2% $CCl_3CCl_3$.

EXAMPLE IV

To a mixture of 1.0 mole arsenic trifluoride, 2.4 ml. antimony pentachloride and a few drops of water in the apparatus described in Example II was added 0.5 mole trans-dichloroethylene. Chlorine was added at the rate of 62.5 ml. per minute until 0.6 mole had been used. Refluxing and stirring were continued for one hour after the chlorine addition was complete.

The reaction was worked up in the usual manner. There was obtained 31.1 grams of product. The following composition was obtained by gas phase chromatography: 60.7% $CFHClCHCl_2$ and 39.3% $CHCl_2CHCl_2$.

EXAMPLE V

The reaction of Example IV was repeated in a similar manner using 0.5 mole cis-dichloroethylene. At the completion of the reaction, the mixture was worked up in the usual manner and 33.8 grams of product was obtained. The product had the following composition: 48.2% $CFHClCHCl_2$ and 51.8% $CHCl_2CHCl_2$.

EXAMPLE VI

In order to exhibit the fact that the active fluorinating species is $[AsCl_4]^+[AsF_6]^-$ and not the reaction sequence of chlorination of the haloalkane followed by the fluorination of the resulting chloroalkane with arsenic trifluoride, the following reaction was carried out.

One mole of arsenic trifluoride and 2.5 ml. antimony pentachloride were placed in a round bottom flask fitted with condenser, thermometer, stirrer and addition funnel. To this was added portionwise 0.5 mole of 1,1,2,2,-tetrachloroethane. The mixture was stirred and gently refluxed for four hours. At the end of this time the reaction was worked up in the usual way. Analysis of the organic layer by gas chromatography indicated no reaction had taken place.

In view of the present example and Examples IV and V, we can see that the complex $[AsCl_4]^+[AsF_6]^-$ must be present to effect a fluorination. Arsenic trifluoride and the chloroalkane is not sufficient. This was shown in this example with tetrachloroethane the possible intermediate chloroalkane of Examples IV and V, and arsenic trifluoride.

EXAMPLE VII

The following example illustrates that other halogens besides chlorine can be present on the double bond of the olefin. Using the apparatus and procedure of Example II, fluorotrichloroethylene (0.5 mole) was added to a mixture of 1.0 mole arsenic trifluoride and 2.5 ml. antimony pentachloride. The fluorochloroarsenic complex was prepared in situ as described above. The reaction mixture was stirred and maintained under a mild reflux during the chlorine addition and for one hour after.

The product was worked up in the usual way. The organic layer was separated and dried over magnesium sulfate. There was obtained 69.3 grams of organic product. The analysis by gas-liquid partition chromatography was: 57.6 difluoro isomers made up as 91% $CFCl_2CFCl_2$ and 9% $CF_2ClCCl_3$, 22.1% $CFCl=CCl_2$ starting material, and 20.3% $CFCl_2CCl_3$. The distribution of the difluoro isomers obtained was established by $F^{19}$ nuclear magnetic resonance spectroscopy.

EXAMPLE VIII

Using the apparatus and procedure described in the above mentioned examples, hexafluorodichlorobutene-2 (0.5 mole) was added to a mixture of arsenic trifluoride (1.0 mole), 2.5 ml. antimony pentachloride and a few drops of water. Chlorine addition was continued until 0.6 mole had been used. The reaction was refluxed for twenty hours after the chlorine addition was complete. The reaction product after the usual work up had the following composition by gas-liquid partition chromatography: 15.6% $CF_3CCl_2CFClCF_3$ and 84.4%

$$CF_3CCl=CClCF_3$$

Various changes and modifications may be made in the process described herein as will be apparent to those skilled in the chemical arts. It is accordingly intended that the present invention shall only be limited by the scope of the appended claims.

We claim:
1. The process of preparing at least one member of the group consisting of chlorofluoroalkanes which comprises reacting the inorganic fluorochloroarsenic complex $[AsCl_4]^+[AsF_6]^-$ with a halogenated olefin; said halogen containing olefin containing from 2 to 4 carbon atoms and at least one halogen atom bonded to at least one carbon atom at the double bond, said halogen atoms selected from the group consisting of chlorine, fluorine and combinations thereof; and isolating the resulting chlorofluoroalkane.

2. The process in claim 1 wherein the said inorganic fluorochloroarsenic complex $[AsCl_4]^+[AsF_6]^-$ is formed in situ by bringing together arsenic trifluoride and chlorine gas in the presence of said halogenated olefin, and isolating the resulting fluorine containing haloalkane.

3. The process in claim 1 wherein said inorganic fluorochloroarsenic complex $[AsCl_4]^+[AsF_6]^-$ is reacted with a halogenated olefin; said halogenated olefin containing at least one halogen atom bonded to at least one carbon atom at the double bond; in the presence of a Lewis acid type catalyst and isolating the resulting fluorine containing haloalkane.

4. The process in claim 2 wherein the said inorganic fluorochloroarsenic complex $[AsCl_4]^+[AsF_6]^-$ formed in situ is reacted with said halogenated olefin in the presence of a Lewis acid type catalyst and isolating the resulting fluorine containing haloalkane.

5. The process in claim 3 wherein the said Lewis type catalyst is antimony pentachloride.

6. The process in claim 4 wherein the said Lewis type catalyst is antimony pentachloride.

References Cited by the Examiner

Booth et al., Ind. Eng. Chem. 21, 328–331 (1932).

Lovelace et al., Aliphatic Fluorine Compounds, pages 7 and 8 (1958), Reinhold Publishing Company, New York, N.Y.

Kolditz, Zeit Anorg. Allg. Chem. 280, 313–320 (1955).

LEON ZITVER, *Primary Examiner.*

DANIEL D. HORWITZ, *Assistant Examiner.*